(12) United States Patent
Nagatoshi

(10) Patent No.: US 9,001,429 B2
(45) Date of Patent: Apr. 7, 2015

(54) OPTICAL SYSTEM FOR PROJECTION AND PROJECTION-TYPE DISPLAY APPARATUS

(71) Applicant: FUJIFILM Corporation, Tokyo (JP)

(72) Inventor: Yukiko Nagatoshi, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/456,362

(22) Filed: Aug. 11, 2014

(65) Prior Publication Data

US 2014/0347740 A1 Nov. 27, 2014

Related U.S. Application Data

(63) Continuation of application No. PCT/JP2013/000520, filed on Jan. 31, 2013.

(30) Foreign Application Priority Data

Feb. 9, 2012 (JP) ................. 2012-025824

(51) Int. Cl.

| G02B 13/22 | (2006.01) |
| G03B 21/14 | (2006.01) |
| G02B 15/167 | (2006.01) |
| G02B 15/20 | (2006.01) |
| G02B 7/02 | (2006.01) |
| G02B 15/14 | (2006.01) |
| G03B 21/00 | (2006.01) |

(52) U.S. Cl.
CPC ............ *G03B 21/142* (2013.01); *G02B 15/167* (2013.01); *G02B 15/20* (2013.01); *G02B 7/028* (2013.01); *G02B 13/22* (2013.01); *G02B 15/14* (2013.01); *G03B 21/005* (2013.01)

(58) Field of Classification Search
CPC ......... G02B 13/22; G02B 13/16; G02B 13/18
USPC ........................................ 359/663, 649–653
See application file for complete search history.

(56) References Cited

U.S. PATENT DOCUMENTS

| 2003/0147061 | A1* | 8/2003 | Omura ............................ 355/67 |
| 2003/0227693 | A1* | 12/2003 | Otomo ........................... 359/772 |
| 2006/0007556 | A1 | 1/2006 | Okajima et al. |
| 2006/0227415 | A1 | 10/2006 | Caldwell et al. |
| 2007/0236810 | A1* | 10/2007 | Masui et al. .................. 359/740 |
| 2008/0231962 | A1 | 9/2008 | Yamada |
| 2011/0002034 | A1* | 1/2011 | Shimo et al. .................. 359/434 |

FOREIGN PATENT DOCUMENTS

| JP | 2002-341243 | 11/2002 |
| JP | 2004-264570 | 9/2004 |
| JP | 2006-048013 | 2/2006 |

(Continued)

OTHER PUBLICATIONS

International Search Report, PCT/JP2013/000520, Jun. 4, 2013.

*Primary Examiner* — Scott J Sugarman
(74) *Attorney, Agent, or Firm* — Young & Thompson

(57) ABSTRACT

In an optical system for projection that is telecentric on a reduction side, a correction lens group substantially consisting of a part of lens groups in the optical system for projection is configured to move in the direction of an optical axis to correct a shift in a focal position caused by a change in temperature, and predetermined conditional formulas are satisfied.

10 Claims, 11 Drawing Sheets

(56) References Cited

FOREIGN PATENT DOCUMENTS

| JP | 2008-026864 | 2/2008 |
| JP | 2008-046259 | 2/2008 |
| JP | 2008-536175 | 9/2008 |
| JP | 2011-022498 | 2/2011 |
| JP | 2011-039352 | 2/2011 |
| JP | 2012-032717 | 2/2012 |

* cited by examiner

EXAMPLE 4

FIG.8 EXAMPLE 3

FIG.9
EXAMPLE 4
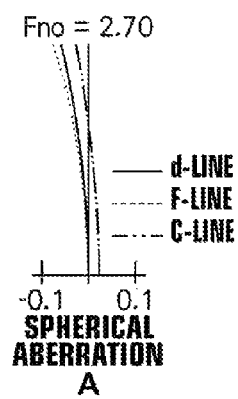
Fno = 2.70
- d-LINE
- F-LINE
- C-LINE
-0.1  0.1
SPHERICAL ABERRATION
A
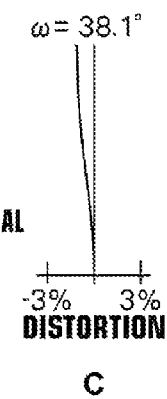
ω = 38.1°
- SAGITTAL
- TANGENTIAL
-0.1  0.1
ASTIGMATISM
B
ω = 38.1°
-3%  3%
DISTORTION
C
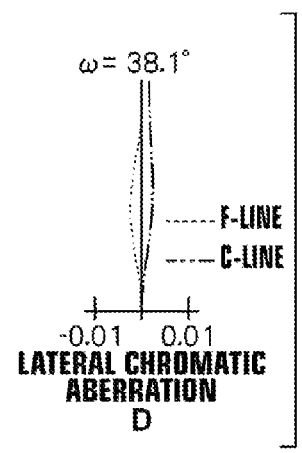
ω = 38.1°
- F-LINE
- C-LINE
-0.01  0.01
LATERAL CHROMATIC ABERRATION
D

OPTICAL SYSTEM FOR PROJECTION AND PROJECTION-TYPE DISPLAY APPARATUS

CROSS-REFERENCE TO RELATED APPLICATIONS

This application is a Continuation of PCT International Application No. PCT/JP2013/000520 filed on Jan. 31, 2013, which claims priority under 35 U.S.C. §119 (a) to Japanese Patent Application No. 2012-025824 filed on Feb. 9, 2012. Each of the above applications is hereby expressly incorporated by reference, in its entirety, into the present application.

BACKGROUND OF THE INVENTION

1. Field of the Invention

The present invention relates to an optical system for projection and a projection-type display apparatus. Particularly, the present invention relates to an optical system for projection that has taken temperature compensation into consideration and a projection-type display apparatus on which the optical system for projection is mounted.

2. Description of the Related Art

Conventionally, projection-type display apparatuses, which magnify and project an image displayed on a light valve, were used in presentation and the like. As the light valve, a transmission-type liquid crystal display device, a reflection-type liquid crystal display device, a DMD (Digital Micromirror Device: Registered Trademark) and the like are known. Meanwhile, a high output power light source is often used in a projection-type display apparatus. Therefore, temperature changes in the optical system. In recent years, the level of the definition of a projection-type display apparatus became higher because of a progress in the light valve and the like, and an out-of-focus condition caused by a change in temperature in the optical system became more noticeable. Further, as a higher definition became requested, a material with a large Abbe number (for example, a material with an Abbe number of 75 or higher) became often used to reduce chromatic aberrations, and that also increased the degree of the out-of-focus condition caused by the change in temperature.

As related techniques about optical systems for projection with respect to correction of an out-of-focus condition caused by a change in temperature, techniques disclosed, for example, in Japanese Unexamined Patent Publication No. 2008-046259 (Patent Document 1), Japanese Unexamined Patent Publication No. 2011-022498 (Patent Document 2) and Japanese Unexamined Patent Publication No. 2006-048013 (Patent Document 3) are known. Patent Document 1 discloses a technique for offsetting a shift in a focal position caused by a change in temperature in a projection-type zoom lens by arranging anomalous dispersion glass with an Abbe number of 70 or higher at appropriate positions by using the anomalous dispersion glass in a positive lens and a negative lens, and by making each of the positive lens and the negative lens constitute a cemented lens. Patent Document 2 discloses a projection lens apparatus that offsets a shift in a focal position caused by a change in temperature of anomalous dispersion lens by the amount of movement of the anomalous dispersion lens caused by a change in temperature of a lens barrel in which a lens group including the anomalous dispersion glass is arranged. Patent Document 3 discloses a technique for correcting a change in a distance between an object and an image caused by a change in temperature. The change in the distance is corrected by supporting at least a part of lenses in a light-source-side positive lens group by plural members having different linear expansion coefficients from each other, and by moving the lenses in the direction of an optical axis by a difference in expansion or contraction of the plural members caused by a change in temperature.

SUMMARY OF THE INVENTION

However, if a shift in a focal position caused by a change in temperature is corrected by selection of the material of lenses or by power balance, as in the technique disclosed in Patent Document 1, achievement of high optical performance may be prevented. Further, in the apparatus disclosed in Patent Document 2, the entire lens system is moved in the direction of the optical axis. Therefore, the size of the apparatus is large. In the technique disclosed in Patent Document 3, only a part of the optical system is moved. Therefore, the size does not become large. However, optical performance may deteriorate by correcting a shift in a focal position caused by a change in temperature, and the optical system may not be able to cope with a light valve with a higher definition of recent years.

In view of the foregoing circumstances, it is an object of the present invention to provide an optical system for projection that can excellently correct a shift in a focal position caused by a change in temperature while suppressing an increase in the size of an apparatus, and that can maintain high optical performance also after correction, and a projection-type display apparatus including such an optical system for projection.

An optical system for projection of the present invention is an optical system for projection that is telecentric on a reduction side, and a correction lens group substantially consisting of a part of lens groups in the optical system for projection is configured to move in the direction of an optical axis to correct a shift in a focal position caused by a change in temperature. Further, the following conditional formulas (1) and (2) are satisfied:

$$0.5 < |\Delta Bf/(fw/100)| < 5.0 \qquad (1);$$

and $$|(\Delta At \times fw)/(\Delta Bf \times Im\phi)| < 0.12 \qquad (2),$$

where $\Delta Bf$: a movement amount of a reduction-side focal position when the correction lens group has been moved by fw/100, fw: a focal length of an entire system, $\Delta At$: a variation amount of a tangential component of astigmatism at a maximum angle of view when the correction lens group has been moved by fw/100, and $Im\phi$: the diameter of a maximum effective image circle on the reduction side. Further, $\Delta Bf$, fw and $\Delta At$ are values at a wide angle end when the optical system for projection is a variable magnification optical system.

In the optical system for projection of the present invention, it is desirable that the following conditional formula (1') is satisfied:

$$0.8 < |\Delta Bf/(fw/100)| < 2.0 \qquad (1').$$

In the optical system for projection of the present invention, it is desirable that the following conditional formula (2') is satisfied:

$$|(\Delta At \times fw)/(\Delta Bf \times Im\phi)| < 0.07 \qquad (2').$$

Further, in the optical system for projection of the present invention, it is desirable that the following conditional for mula (3) is satisfied. It is more desirable that the following conditional formula (3') is satisfied:

$$|D/fpr|<0.50 \quad (3);$$

and $$|D/fpr|<0.40 \quad (3'),$$

where

D: a distance on the optical axis from a magnification-side focal position of a combined optical system of the correction lens group through a most reduction-side lens in the entire system to a most magnification-side lens surface in the correction lens group, and fpr: a focal length of the combined optical system of the correction lens group through the most reduction-side lens in the entire system. Further, D and fpr are values at a wide angle end when the optical system for projection is a variable magnification optical system.

Further, in the optical system for projection of the present invention, it is desirable that the following conditional formula (4) is satisfied. It is more desirable that the following conditional formula (4') is satisfied:

$$dd/L>0.05 \quad (4);$$

and $$dd/L>0.08 \quad (4'),$$

where when the optical system for projection is a fixed focus optical system,

L: a distance on the optical axis from a most magnification-side lens surface in the entire system to a most reduction-side lens surface in the entire system, and dd: a sum of a magnification-side lens surface distance from the correction lens group and a reduction-side lens surface distance from the correction lens group, and when the optical system for projection is a variable magnification optical system, L: a maximum value of a distance on the optical axis from a most magnification-side lens surface in the entire system to a most reduction-side lens surface in the entire system, and dd: a minimum value of a sum of a magnification-side lens surface distance from the correction lens group and a reduction-side lens surface distance from the correction lens group.

In the optical system for projection of the present invention, it is desirable that at least three positive lenses with Abbe numbers of 75 or higher for d-line are included.

The term "lens group" and the term "correction lens group" do not necessary mean a group substantially consisting of plural lenses. They may mean a group substantially consisting of only one lens. In the optical system for projection of the present invention, the correction lens group may substantially consist of a single lens.

In the optical system for projection of the present invention, it is desirable that the correction lens group moves neither during zooming nor during focusing.

A projection-type display apparatus of the present invention includes a light source, a light valve on which light from the light source is incident and the optical system for projection of the present invention as described above, as an optical system for projection that projects an optical image of light that has been optically modulated by the light valve onto a screen.

Here, the term "magnification side" means a projected side (a screen side). Also in reduction projection, the screen side will be referred to as the magnification side for the sake of convenience. On the other hand, the term "reduction side" means an original image display area side (a light valve side). Also in reduction projection, the light valve side will be referred to as the reduction side for the sake of convenience.

Further, the expression "telecentric on a reduction side" represents a state in which a bisector of an angle between the maximum ray on the upper side and the maximum ray on the lower side in a cross section of rays converging at an arbitrary point on a reduction-side image plane is nearly parallel to an optical axis. The expression does not mean only a perfect telecentric case, i.e., a case in which the bisector of the angle is perfectly parallel to the optical axis. The expression also means a case with some error. Here, the case with some error means that the inclination of the bisector of the angle with respect to the optical axis is within the range of ±3°.

Further, the aforementioned "Imφ" may be obtained, for example, based on the specification of the optical system for projection or the specification of an apparatus on which the optical system for projection is mounted.

The optical system for projection of the present invention is configured in such a manner that apart of lens groups, as a correction lens group, is moved to correct a shift in a focal position caused by a change in temperature. Therefore, it is possible to prevent an increase in the size of the apparatus. Further, the optical system for projection of the present invention is configured to satisfy conditional formulas (1) and (2). Therefore, it is possible to excellently correct a shift in a focal position while suppressing an increase in the size of the apparatus, and to maintain high optical performance also after correction.

Further, the projection-type display apparatus of the present invention includes the optical system for projection of the present invention. Therefore, the structure is compact, and an excellent projection image is obtainable even when temperature has changed.

BRIEF DESCRIPTION OF THE DRAWINGS

FIG. 9, Sections A through D are aberration diagrams of the optical system for projection in Example 4 of the present invention;

DESCRIPTION OF THE PREFERRED EMBODIMENTS

Figure 1:
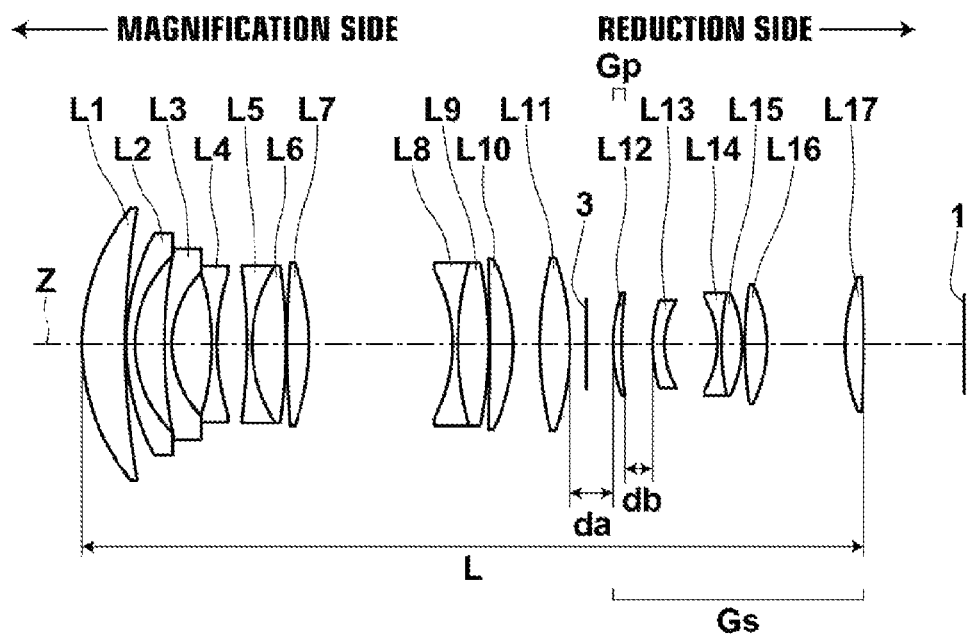
FIG. 1 is a cross section illustrating the lens structure of an optical system for projection according to an embodiment of the present invention.

Hereinafter, embodiments of the present invention will be described in detail with reference to drawings. FIG. 1 is a cross section illustrating an example of the structure of an optical system for projection according to an embodiment of the present invention.

The optical system for projection illustrated in FIG. 1 includes lens L1 through lens L17 arranged in this order from a magnification side. A stop 3 is arranged between lens L11 and lens L12. In FIG. 1, the left side of the diagram is a magnification side, and the right side of the diagram is a reduction side. A case of mounting the optical system for projection on a projection-type display apparatus is assumed, and an image display surface 1 of a light valve is also illustrated.

The optical system for projection illustrated in FIG. 1 is a zoom lens. FIG. 1 illustrates a lens structure at a wide angle end. However, the optical system for projection of the present invention is not limited to a zoom lens. The present invention may be applied also to a varifocal lens and a fixed focus optical system.

The optical system for projection according to an embodiment of the present invention is configured to be telecentric on a reduction side. Further, the optical system for projection according to the embodiment of the present invention is configured in such a manner that a correction lens group substantially consisting of a part of lens groups of the optical system moves in the direction of an optical axis to correct a shift in a focal position caused by a change in temperature. Not the entire lens system, but only a part of the lens groups is moved to correct a shift in the focal position caused by a change in temperature. Therefore, it is possible to prevent an increase in the size of the apparatus.

As a mechanism for moving the correction lens group in the direction of the optical axis, a mechanism for example as disclosed in Patent Document 3 may be used. In the mechanism, lenses are supported by a combination of plural members having different linear expansion coefficients from each other, and the lenses are moved in the direction of the optical axis by a difference in expansion or contraction of the plural members. Alternatively, other known methods may be used.

In the example illustrated in FIG. 1, lens L12, which is a positive single lens, is used as correction lens group Gp. The present invention will be described with reference to this example. However, the correction lens group of the present invention may be a positive lens group or a negative lens group. Further, the correction lens group may consist of plural lenses.

Next, structures to be desirably included in an optical system for projection according to an embodiment of the present invention and their actions and effects will be described. As a desirable embodiment, one of the structures that will be described next may be included, or an arbitrary combination of them may be included. It is desirable that the structures that will be described next are optionally included in an appropriate manner based on the requirement for an optical system for projection.

It is desirable that this optical system for projection satisfies the following conditional formula (1):

$$0.5 < |\Delta Bf/(fw/100)| < 5.0 \tag{1}$$

where $\Delta Bf$: a movement amount of a reduction-side focal position when the correction lens group has been moved by fw/100, and fw: a focal length of an entire system. Further, $\Delta Bf$ and fw are values at a wide angle end when the optical system for projection is a variable magnification optical system.

If the lower limit of conditional formula (1) is not satisfied, the amount of movement of correction lens group Gp that is moved for correction becomes large. Therefore, it is impossible to make the system compact. If the upper limit of conditional formula (1) is not satisfied, the sensitivity of correction lens group Gp becomes high. Therefore, excellent correction becomes difficult. When conditional formula (1) is satisfied, it is possible to excellently correct a shift in a focal position when a temperature has changed while suppressing an increase in the size of the apparatus.

It is desirable that this optical system for projection satisfies the following conditional formula (2):

$$|(\Delta At \times fw)/(\Delta Bf \times Im\phi)| < 0.12 \tag{2}$$

where $\Delta Bf$: a movement amount of a reduction-side focal position when the correction lens group has been moved by fw/100, fw: a focal length of an entire system, $\Delta At$: a variation amount of a tangential component of astigmatism at a maximum angle of view when the correction lens group has been moved by fw/100, and $Im\phi$: the diameter of a maximum effective image circle on the reduction side. Further, $\Delta Bf$, fw and $\Delta At$ are values at a wide angle end when the optical system for projection is a variable magnification optical system.

If the upper limit of conditional formula (2) is not satisfied, a deterioration of curvature of field in a peripheral portion of an image formation area becomes large when correction lens group Gp has been moved. Therefore, it becomes difficult to maintain excellent optical performance after correction. When conditional formula (2) is satisfied, it is possible to maintain excellent optical performance after correction.

It is desirable that this optical system for projection satisfies the following conditional formula (3):

$$|D/fpr| < 0.50 \tag{3}$$

where

D: a distance on the optical axis from a magnification-side focal position of a combined optical system of the correction lens group through a most reduction-side lens in the entire system to a most magnification-side lens surface in the correction lens group, and fpr: a focal length of the combined optical system of the correction lens group through the most reduction-side lens in the entire system. Further, D and fpr are values at a wide angle end when the optical system for projection is a variable magnification optical system.

FIG. 1 illustrates a combined optical system of correction lens group Gp through a most reduction-side lens in the entire system, as rear-side lens group Gs. When a magnification side is regarded as a front side, D corresponds to a front focus of this rear-side lens group Gs, and fpr corresponds to a focal length of this rear-side lens group Gs. In an optical system for projection that is telecentric on the reduction side, when the optical system for projection is configured to satisfy conditional formula (3), correction lens group Gp is arranged in the vicinity of a pupil. Therefore, it is possible to reduce the lens diameter of correction lens group Gp, and to make the system compact. Meanwhile, the density of rays is high in the vicinity of a pupil. Therefore, when the optical system for projection is mounted on a projection-type display apparatus, a change in temperature caused by a light source quickly and sensitively appears in the vicinity of the pupil. When a correction mechanism is provided in the vicinity of the pupil, it is possible to efficiently correct a shift in a focal position caused by a change in temperature.

It is desirable that this optical system for projection satisfies the following conditional formula (4):

$$dd/L > 0.05 \qquad (4),$$

where when the optical system for projection is a fixed focus optical system,

L: a distance on the optical axis from a most magnification-side lens surface in the entire system to a most reduction-side lens surface in the entire system, and dd: a sum of a magnification-side lens surface distance from the correction lens group and a reduction-side lens surface distance from the correction lens group, and when the optical system for projection is a variable magnification optical system, L: a maximum value of a distance on the optical axis from a most magnification-side lens surface in the entire system to a most reduction-side lens surface in the entire system, and dd: a minimum value of a sum of a magnification-side lens surface distance from the correction lens group and a reduction-side lens surface distance from the correction lens group.

Here, the term "magnification-side lens surface distance from correction lens group Gp" means a surface distance on an optical axis from correction lens group Gp to a lens that is located on the magnification side of correction lens group Gp and next to correction lens group Gp. In the example illustrated in FIG. 1, the magnification-side lens surface distance from correction lens group Gp is a distance on the optical axis between a reduction-side lens surface of lens L11 and a magnification-side lens surface of lens L12, and the distance is indicated by the sign "da" in FIG. 1. Similarly, the term "reduction-side lens surface distance from correction lens group Gp" means a surface distance on the optical axis from correction lens group Gp to a lens that is located on the reduction side of correction lens group Gp and next to correction lens group Gp. In the example illustrated in FIG. 1, the reduction-side lens surface distance from correction lens group Gp is a distance on the optical axis between a reduction-side lens surface of lens L12 and a magnification-side lens surface of lens L13, and the distance is indicated by the sign "db" in FIG. 1. Therefore, dd=da+db. Further, FIG. 1 illustrates L.

When the lower limit of conditional formula (4) is satisfied, it is possible to provide sufficient space for arranging a correction mechanism on the magnification side or the reduction side of correction lens group Gp. Therefore, it is possible to excellently correct a shift in the focal position caused by a change in temperature.

Because of the reasons as described above, it is more desirable that the optical system for projection according to embodiments of the present invention satisfies the following conditional formulas (1') through (4') instead of conditional formulas (1) through (4), respectively:

$$0.8 < |\Delta Bf/(fw/100)| < 2.0 \qquad (1');$$

$$|(\Delta At \times fw)/(\Delta Bf \times Im\phi)| < 0.07 \qquad (2');$$

$$|D/fpr| < 0.40 \qquad (3');$$

and $$dd/L > 0.08 \qquad (4').$$

Further, it is desirable that the optical system for projection according to an embodiment of the present invention includes at least three positive lenses with Abbe numbers of 75 or higher for d-line. Consequently, it is possible to excellently correct chromatic aberrations, and to cope with a light valve with a higher definition.

Further, it is desirable that correction lens group Gp substantially consists of a single lens or a cemented lens to simplify the configuration of the apparatus and to reduce the size of the apparatus. When correction lens group Gp substantially consists of a single lens, it is possible to reduce a load on a drive system even more, and that is advantageous to further reduction in size. When correction lens group Gp is arranged in the vicinity of a pupil and used together with a high output power light source in a projection-type display apparatus, if correction lens group Gp includes a cemented lens, adhesive may deteriorate by intense light. When correction lens group Gp substantially consists of a single lens, it is possible to prevent such a problem.

Further, it is desirable that correction lens group Gp is moved neither during zooming nor during focusing. Consequently, it is possible to correct a shift in a focal position caused by a change in temperature while simplifying the configuration, and that contributes to reduction in size and reduction in cost.

Next, specific examples of the optical system for projection of the present invention will be described.

Example 1

Figure 2:
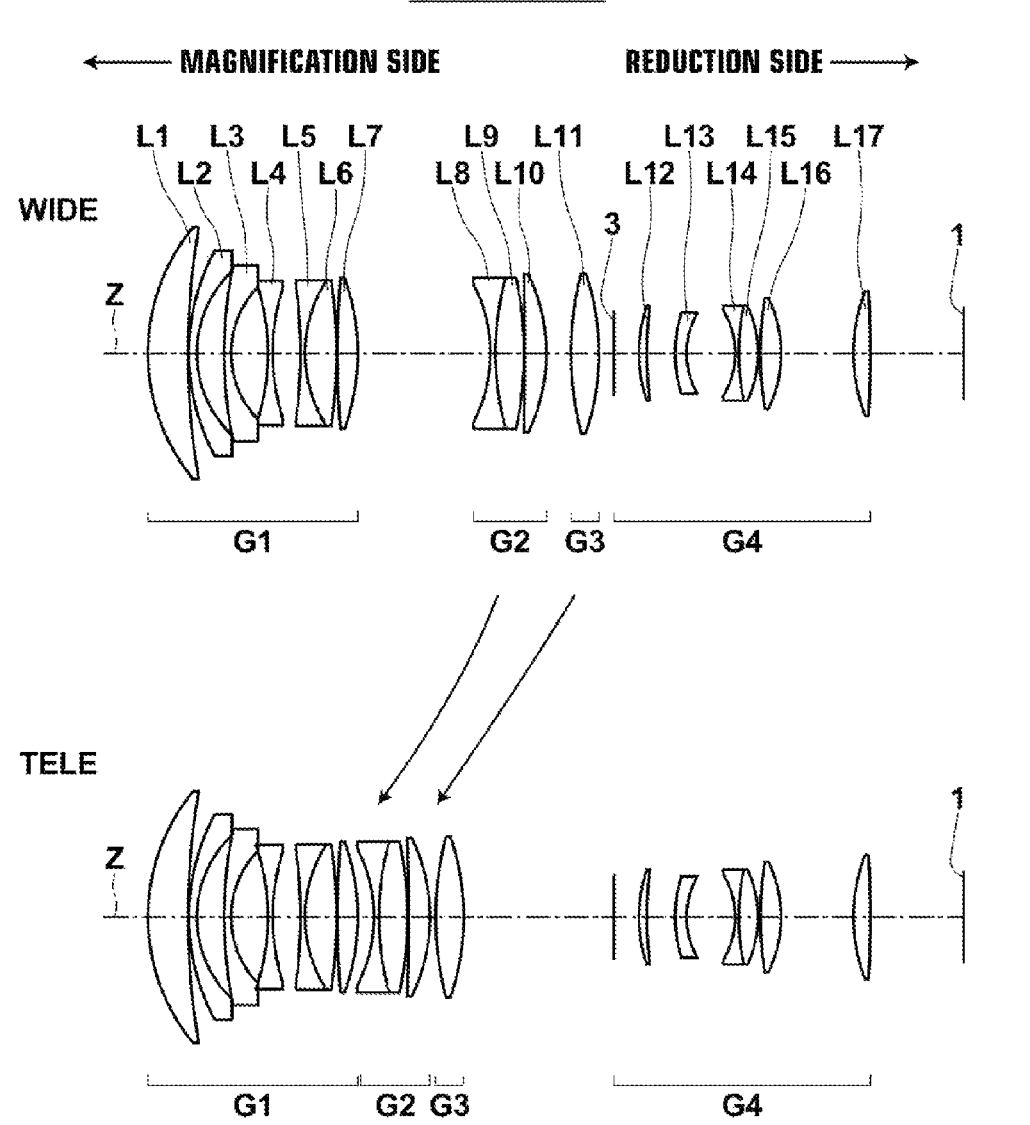
FIG. 2 is a cross section illustrating the lens structure of an optical system for projection in Example 1 of the present invention.

FIG. 2 is a diagram illustrating the lens structure of an optical system for projection in Example 1. The optical system for projection in Example 1 is a zoom lens substantially consisting of first lens group G1, second lens group G2, third lens group G3 and fourth lens group G4 arranged in this order from the magnification side. First lens group G1 and fourth lens group G4 are fixed during magnification change. The optical system is configured in such a manner that second lens group G2 and third lens group G3 move toward the magnification side while magnification is changed from a wide angle end to a telephoto end.

In FIG. 2, the upper row illustrates the arrangement of lenses at a wide angle end, and the lower row illustrates the arrangement of lenses at a telephoto end. Arrows between the upper row and the lower row schematically illustrate movement directions of lens groups that move during magnification change from a wide angle end to a telephoto end.

First lens group G1 substantially consists of lens L1 through lens L7 arranged in this order from the magnification side. Second lens group G2 substantially consists of lens L8 through lens L10 arranged in this order from the magnification side. Third lens group G3 substantially consists of lens L11. Fourth lens group G4 substantially consists of a stop 3 and lens L12 through lens L17 arranged in this order from the magnification side.

Table 1 shows lens data on the optical system for projection in Example 1. In Table 1, (A), column Si shows the surface number of the i-th surface (i=1, 2, 3, . . . ) when the magnification-side surface of the most magnification-side composition element is the first surface, and surface numbers are assigned to surfaces of composition elements to sequentially increase toward the reduction side. Column Ri shows the curvature radius of the i-th surface, and column Di shows a distance between the i-th surface and the (i+1)th surface on optical axis Z. Column Ndj shows the refractive index of the j-th composition element (j=1, 2, 3, . . . ) for d-line (wavelength is 587.6 nm). The most magnification-side composition element is the first composition element, and the number j sequentially increases toward the reduction side. The column vdj shows the Abbe number of the j-th composition element for d-line.

The sign of a curvature radius is positive when a surface shape is convex toward the magnification side, and negative when a surface shape is convex toward the reduction side. A distance between first lens group G1 and second lens group G2, a distance between second lens group G2 and third lens group G3, and a distance between third lens group G3 and fourth lens group G4 change during magnification change. In the column of surface distances, the term "(VARIABLE 1)", the term "(VARIABLE 2)", and the term "(VARIABLE 3)" are written in rows corresponding to these distances, respectively.

Table 1, (B) shows focal lengths of the entire system of the optical system for projection in Example 1, and values of a zoom ratio, the aforementioned (VARIABLE 1), (VARIABLE 2) AND (VARIABLE 3), and F-number Fno. at each of the focal lengths. Here, values in Table 1 are normalized values so that the focal length of the entire system at a wide angle end is 20.00, and the focal length of the entire system at a telephoto end is 29.37. Further, Table 1 shows values when a projection distance is 2240. Hereinafter, numerical values in tables are rounded at predetermined digits.

TABLE 1

EXAMPLE 1 (PROJECTION DISTANCE 2240)

(A)

| Si | Ri | Di | Ndj | v dj |
|---|---|---|---|---|
| 1 | 44.8532 | 9.0003 | 1.77250 | 49.60 |
| 2 | 166.3304 | 0.2036 | | |
| 3 | 48.9568 | 1.7740 | 1.49700 | 81.54 |
| 4 | 25.6534 | 6.1727 | | |
| 5 | 101.3076 | 1.5424 | 1.61800 | 63.33 |
| 6 | 21.5571 | 8.2957 | | |
| 7 | −49.4280 | 1.0588 | 1.80809 | 22.76 |
| 8 | 49.4280 | 6.2026 | | |
| 9 | −117.3315 | 1.0722 | 1.71736 | 29.52 |
| 10 | 30.5286 | 7.0746 | 1.72342 | 37.95 |
| 11 | −113.3635 | 0.2036 | | |
| 12 | 214.7390 | 4.5571 | 1.80518 | 25.42 |
| 13 | −50.5918 | (VARIABLE 1) | | |
| 14 | −33.5979 | 1.1056 | 1.77250 | 49.60 |
| 15 | 64.0625 | 6.4230 | 1.49700 | 81.54 |
| 16 | −83.4697 | 0.2036 | | |
| 17 | −695.4161 | 4.8520 | 1.49700 | 81.54 |
| 18 | −40.9580 | (VARIABLE 2) | | |
| 19 | 71.6911 | 6.3001 | 1.49700 | 81.54 |
| 20 | −56.4832 | (VARIABLE 3) | | |
| 21(STOP) | ∞ | 5.6053 | | |
| 22 | 32.3973 | 1.8001 | 1.80518 | 25.42 |
| 23 | 86.6785 | 6.3628 | | |
| 24 | 30.6723 | 2.5452 | 1.83400 | 37.16 |
| 25 | 18.5095 | 10.9810 | | |
| 26 | −18.5854 | 0.7715 | 1.71736 | 29.52 |
| 27 | 52.7160 | 4.3188 | 1.49700 | 81.54 |
| 28 | −25.3971 | 0.5395 | | |
| 29 | 81.1689 | 4.6646 | 1.49700 | 81.54 |
| 30 | −28.3645 | 16.2435 | | |
| 31 | 39.2315 | 3.7961 | 1.49700 | 81.54 |
| 32 | −265.9405 | | | |

TABLE 1-continued

EXAMPLE 1 (PROJECTION DISTANCE 2240)

(B)

| FOCAL LENGTH | 20.00 | 24.00 | 27.00 | 29.37 |
|---|---|---|---|---|
| ZOOM RATIO | 1.00 | 1.20 | 1.35 | 1.47 |
| (VARIABLE 1) | 29.8159 | 19.0659 | 10.4717 | 3.6495 |
| (VARIABLE 2) | 5.4955 | 2.1554 | 1.2903 | 1.2667 |
| (VARIABLE 3) | 3.3654 | 17.4555 | 26.9148 | 33.7605 |
| Fno. | 2.7 | 2.7 | 2.7 | 2.7 |

In the optical system for projection in Example 1, correction lens group Gp may consist of only lens L12, or only lens L13. Lens L12 is a positive single lens, and lens L13 is a negative single lens. Table 5 and Table 6, which will be presented later, show values corresponding to conditional formulas (1) through (4) and values related to the conditional formulas for a case in which correction lens group Gp consists of only lens L12 and a case in which correction lens group Gp consists of only lens L13, respectively, in the optical system for projection in Example 1. Here, the optical system for projection in Example 1 is configured in such a manner that neither lens L12 nor lens L13 moves both during zooming and during focusing.

Figure 6:
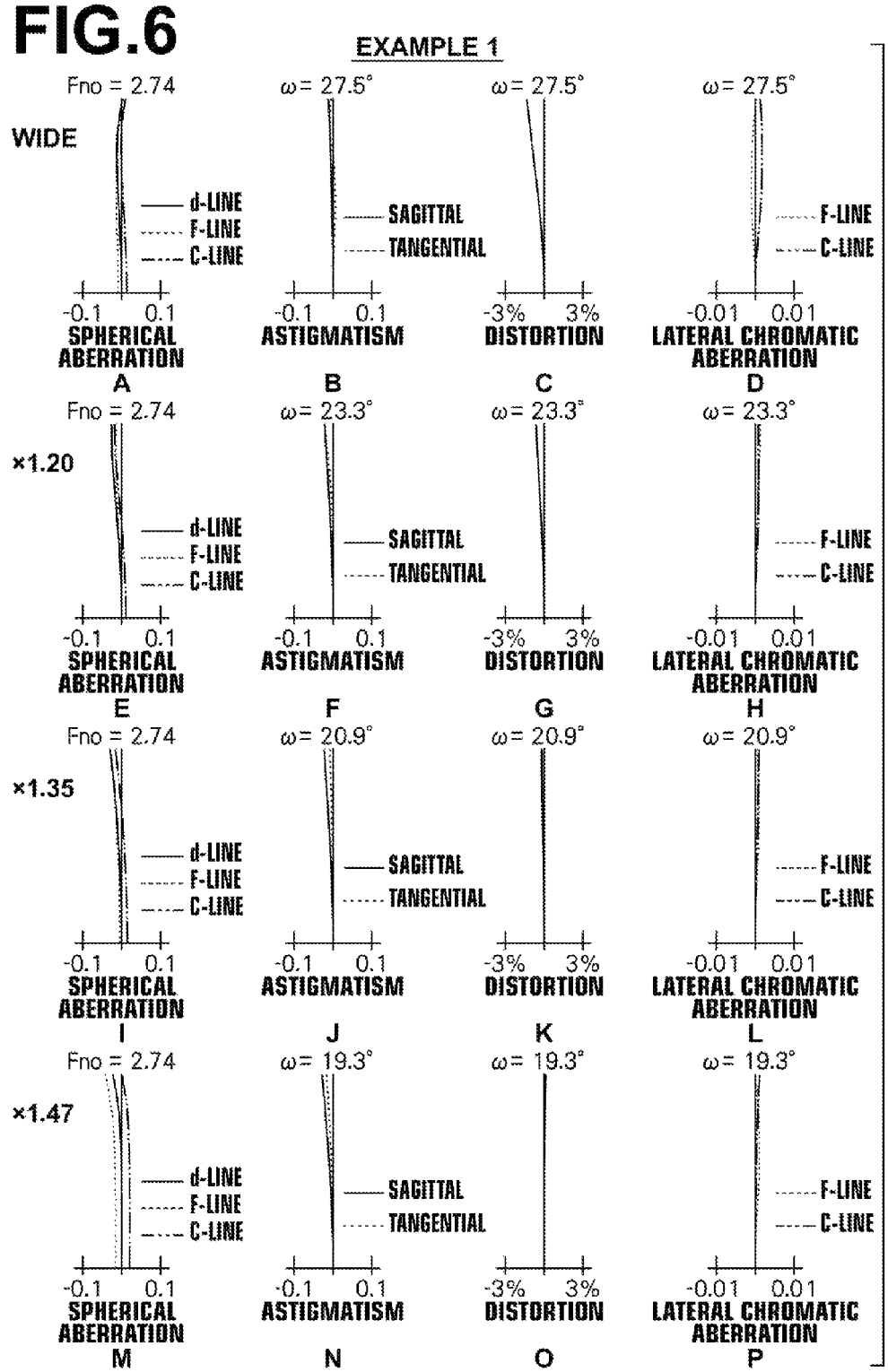
FIG. 6, Sections A through P are aberration diagrams of the optical system for projection in Example 1 of the present invention.

FIG. 6, Sections A through D are aberration diagrams illustrating a spherical aberration, astigmatism, distortion and a lateral chromatic aberration of the optical system for projection in Example 1 at a wide angle end. Similarly, FIG. 6, Sections E through H, FIG. 6, Sections I through L and FIG. 6, Sections M through P illustrate aberration diagrams of the optical system for projection in Example 1 when the zoom ratio is 1.20 times, 1.35 times and 1.47 times, respectively. The values "×1.20", "×1.35" and "×1.47" written in FIG. 6 represent the zoom ratios.

Each of the aberration diagrams in FIG. 6, Sections A through P is based on d-line. The diagrams of spherical aberrations illustrate aberrations also for F-line (wavelength is 486.1 nm) and C-line (wavelength is 656.3 nm). The diagrams of lateral chromatic aberrations illustrate aberrations for F-line and C-line. In the diagrams of astigmatism, an aberration for a sagittal direction and an aberration for a tangential direction are illustrated by a solid line and a broken line, respectively. The sign "Fno." written in the diagrams of the spherical aberrations means an F-number, and the sign "ω" illustrated in the other aberration diagrams means a half angle of view. The aberration diagrams in FIG. 6, Sections A through P illustrate aberrations when a projection distance is 2240.

The signs of various data and their meanings described in the explanation of Example 1 and the methods for description are similar also in the following examples, unless otherwise mentioned specifically.

Example 2

Figure 3:
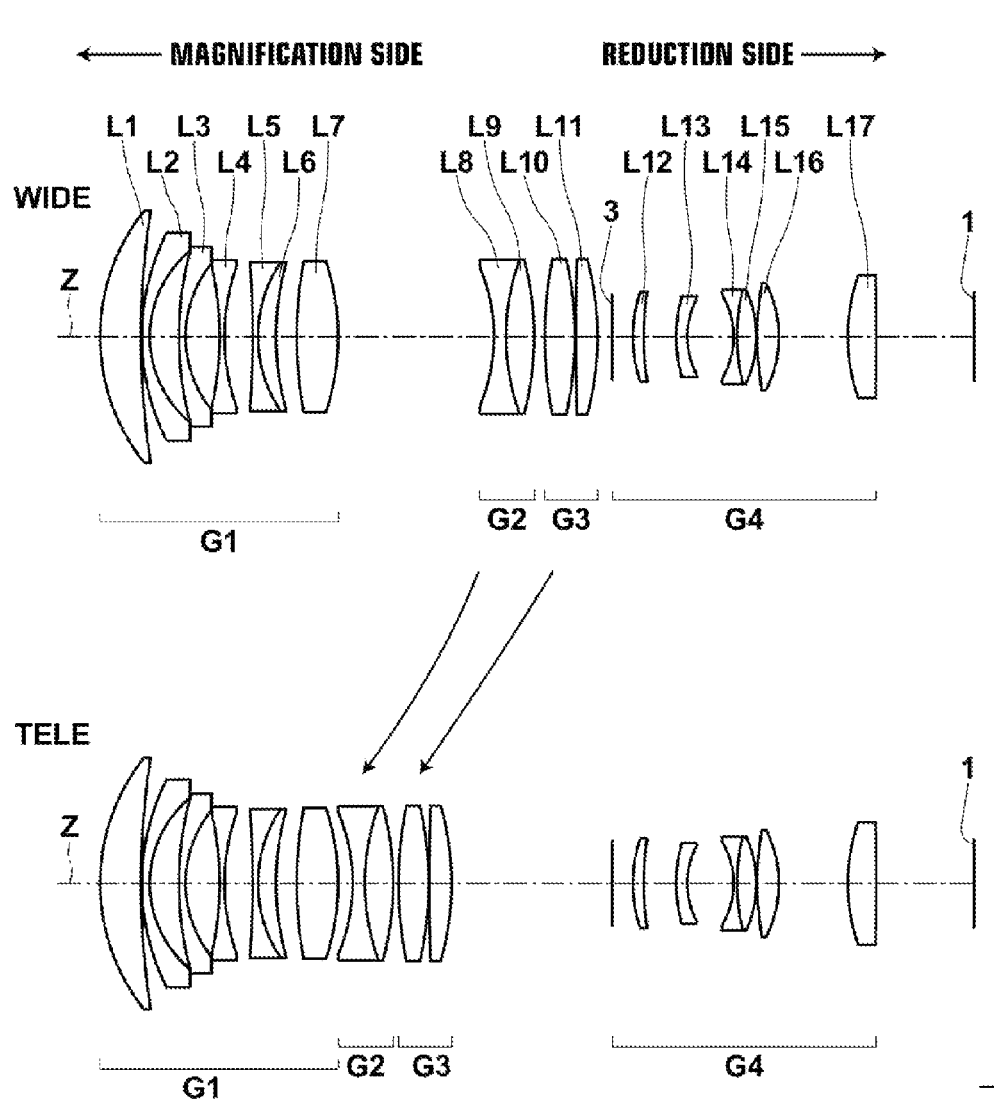
FIG. 3 is a cross section illustrating the lens structure of an optical system for projection in Example 2 of the present invention.

FIG. 3 is a diagram illustrating the lens structure of an optical system for projection in Example 2. The optical system for projection in Example 2 is a zoom lens substantially consisting of first lens group G1, second lens group G2, third lens group G3 and fourth lens group G4 arranged in this order from the magnification side. First lens group G1 and fourth lens group G4 are fixed during magnification change. The optical system is configured in such a manner that second lens group G2 and third lens group G3 move toward the magnification side while magnification is changed from a wide angle end to a telephoto end.

First lens group G1 substantially consists of lens L1 through lens L7 arranged in this order from the magnification side. Second lens group G2 substantially consists of lens L8 and lens L9 arranged in this order from the magnification side. Third lens group G3 substantially consists of lens L10 and lens L11 arranged in this order from the magnification side. Fourth lens group G4 substantially consists of a stop 3 and lens L12 through lens L17 arranged in this order from the magnification side.

Figure 7:
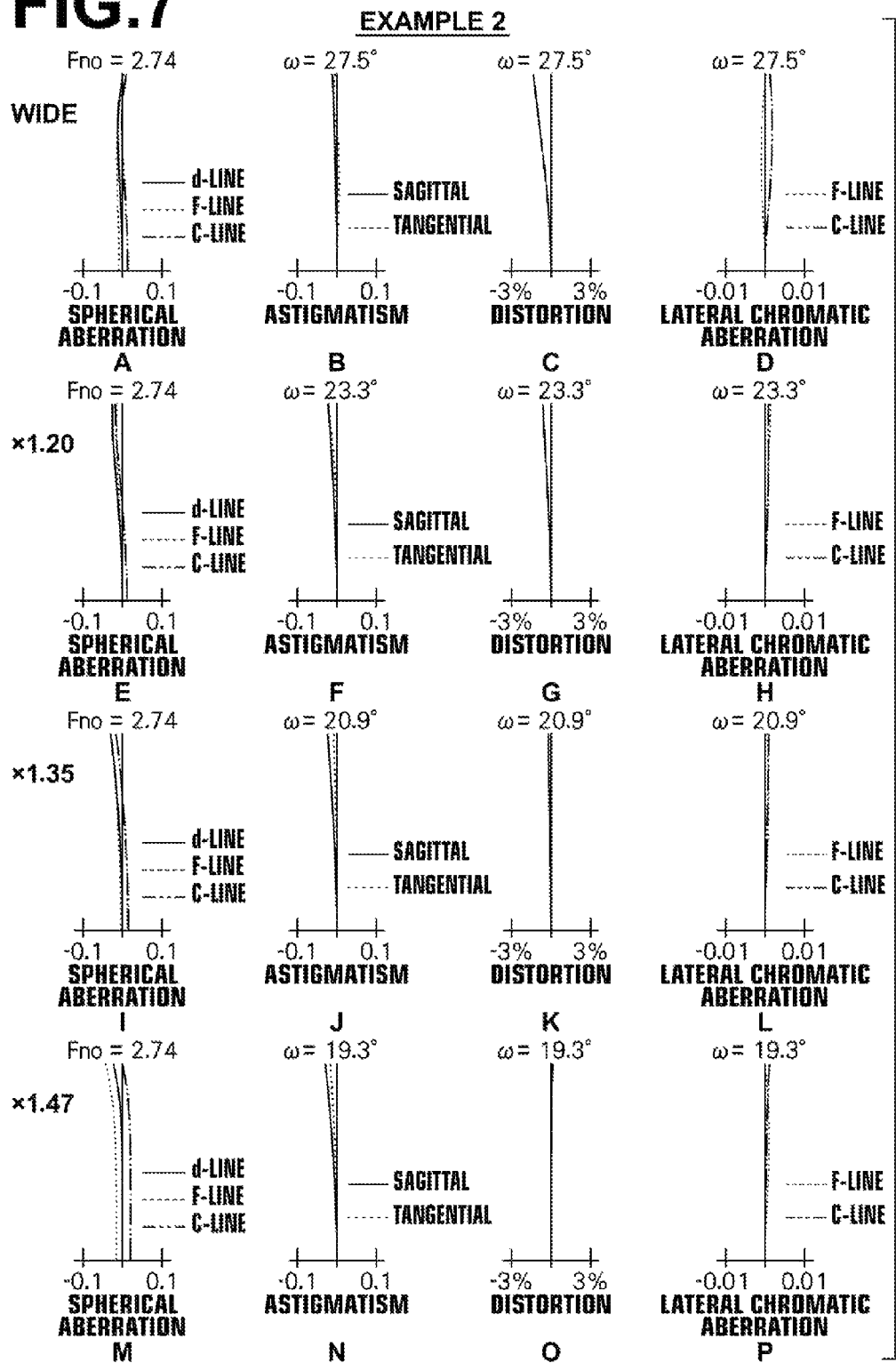
FIG. 7, Sections A through P are aberration diagrams of the optical system for projection in Example 2 of the present invention.

Table 2 shows lens data on the optical system for projection in Example 2. The values in Table 2 are normalized values so that the focal length of the entire system at a wide angle end is 20.00, and the focal length of the entire system at a telephoto end is 29.41. FIG. 7, Sections A through P are aberration diagrams of the optical system for projection in Example 2. Table 2 and FIG. 7, Sections A through P show values when a projection distance is 2240.

TABLE 2

EXAMPLE 2 (PROJECTION DISTANCE 2240)

(A)

| Si | Ri | Di | Ndj | νdj |
|---|---|---|---|---|
| 1 | 47.1509 | 9.4658 | 1.58913 | 61.14 |
| 2 | 193.9109 | 0.2021 | | |
| 3 | 53.8194 | 1.8269 | 1.49700 | 81.54 |
| 4 | 26.0407 | 6.7593 | | |
| 5 | 77.6289 | 1.5420 | 1.49700 | 81.54 |
| 6 | 27.1697 | 7.9034 | | |
| 7 | −74.3448 | 1.1316 | 1.67790 | 55.34 |
| 8 | 49.4362 | 6.5856 | | |
| 9 | −215.2938 | 1.1461 | 1.66680 | 33.05 |
| 10 | 31.0200 | 4.2092 | 1.69350 | 53.21 |
| 11 | 63.2260 | 4.8086 | | |
| 12 | 96.6084 | 9.6051 | 1.78590 | 44.20 |
| 13 | −54.9877 | (VARIABLE 1) | | |
| 14 | −41.8106 | 2.7985 | 1.71700 | 47.92 |
| 15 | 52.5992 | 6.5423 | 1.49700 | 81.54 |
| 16 | −69.7083 | (VARIABLE 2) | | |
| 17 | 93.7151 | 6.9372 | 1.49700 | 81.54 |
| 18 | −82.4631 | 0.2027 | | |
| 19 | 555.3340 | 5.0913 | 1.58913 | 61.14 |
| 20 | −67.6574 | (VARIABLE 3) | | |
| 21(STOP) | ∞ | 4.6851 | | |
| 22 | 32.2842 | 2.5442 | 1.84666 | 23.78 |
| 23 | 73.6748 | 7.5303 | | |
| 24 | 35.0979 | 2.5444 | 1.80518 | 25.42 |
| 25 | 19.0702 | 10.7517 | | |
| 26 | −19.0279 | 0.7715 | 1.72047 | 34.71 |
| 27 | 44.3411 | 4.4971 | 1.49700 | 81.54 |
| 28 | −26.2877 | 0.2034 | | |
| 29 | 73.3979 | 5.0387 | 1.49700 | 81.54 |
| 30 | −27.4728 | 15.9666 | | |
| 31 | 43.0253 | 6.5307 | 1.58913 | 61.14 |
| 32 | −996.1137 | | | |

(B)

| FOCAL LENGTH | 20.00 | 24.00 | 27.00 | 29.41 |
|---|---|---|---|---|
| ZOOM RATIO | 1.00 | 1.20 | 1.35 | 1.47 |
| (VARIABLE 1) | 36.0867 | 21.3296 | 11.0839 | 3.3857 |
| (VARIABLE 2) | 2.4705 | 1.5008 | 1.2642 | 1.2799 |
| (VARIABLE 3) | 3.4597 | 19.1866 | 29.6688 | 37.3514 |
| Fno. | 2.7 | 2.7 | 2.7 | 2.7 |

In the optical system for projection in Example 2, correction lens group Gp may consist of only lens L12, or only lens L13. Lens L12 is a positive single lens, and lens L13 is a negative single lens. Table 5 and Table 6, which will be presented later, show values corresponding to conditional formulas (1) through (4) and values related to the conditional formulas for a case in which correction lens group Gp consists of only lens L12 and a case in which correction lens group Gp consists of only lens L13, respectively, in the optical system for projection in Example 2. Here, the optical system for projection in Example 2 is configured in such a manner that neither lens L12 nor lens L13 moves both during zooming and during focusing.

Example 3

Figure 4:
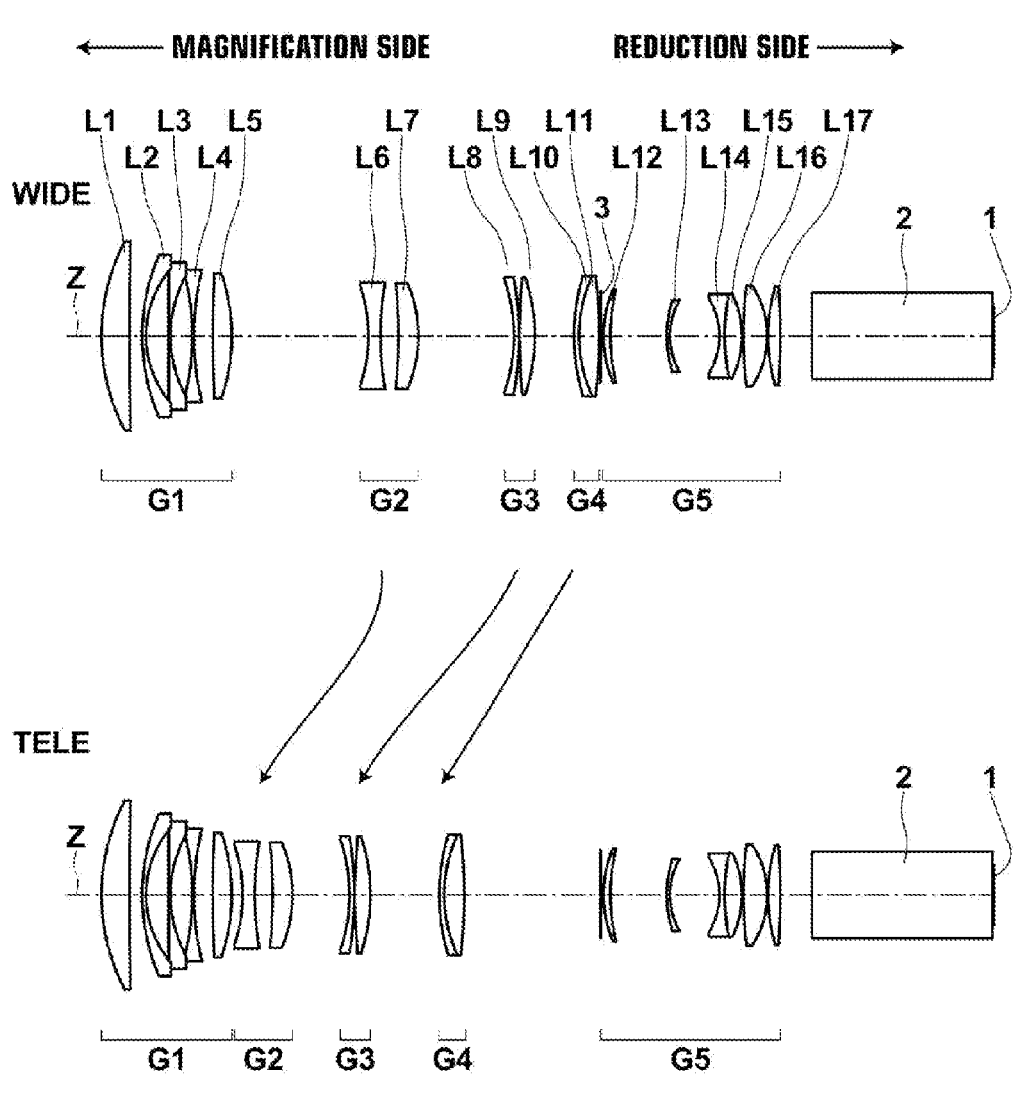
FIG. 4 is a cross section illustrating the lens structure of an optical system for projection in Example 3 of the present invention.

FIG. 4 is a diagram illustrating the lens structure of an optical system for projection in Example 3. The optical system for projection in Example 3 is a zoom lens substantially consisting of first lens group G1, second lens group G2, third lens group G3, fourth lens group G4 and fifth lens group G5 arranged in this order from the magnification side. First lens group G1 and fifth lens group G5 are fixed during magnification change. The optical system is configured in such a manner that second lens group G2, third lens group G3 and fourth lens group G4 move toward the magnification side while magnification is changed from a wide angle end to a telephoto end. FIG. 4 illustrates an example in which a glass block 2 is arranged on the reduction side of fifth lens group G5. The glass block 2 is assumed to be a filter, a prism or the like used in a color combination unit or an illumination light separation unit.

First lens group G1 substantially consists of lens L1 through lens L5 arranged in this order from the magnification side. Second lens group G2 substantially consists of lens L6 and lens L7 arranged in this order from the magnification side. Third lens group G3 substantially consists of lens L8 and lens L9 arranged in this order from the magnification side. Fourth lens group G4 substantially consists of lens L10 and lens L11 arranged in this order from the magnification side. Fifth lens group G5 substantially consists of a stop 3 and lens L12 through lens L17 arranged in this order from the magnification side.

Figure 8:
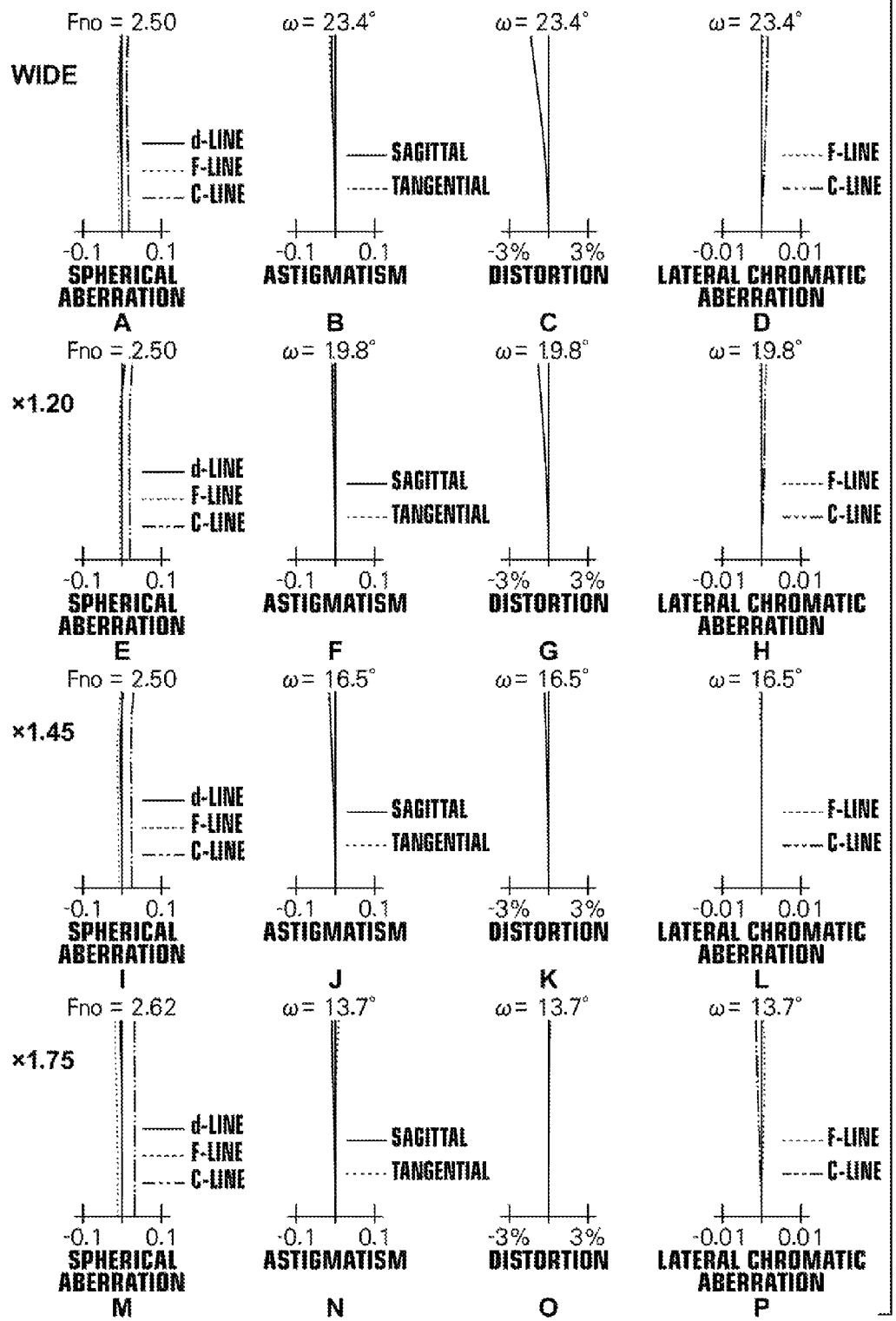
FIG. 8, Sections A through P are aberration diagrams of the optical system for projection in Example 3 of the present invention.

Table 3 shows lens data on the optical system for projection in Example 3. The values in Table 3 are normalized values so that the focal length of the entire system at a wide angle end is 20.00, and the focal length of the entire system at a telephoto end is 34.91. FIG. 8, Sections A through P are aberration diagrams of the optical system for projection in Example 3. Table 3 and FIG. 8, Sections A through P show values when a projection distance is 9940.

TABLE 3

EXAMPLE 3 (PROJECTION DISTANCE 9940)

(A)

| Si | Ri | Di | Ndj | νdj |
|---|---|---|---|---|
| 1 | 58.2163 | 7.9241 | 1.48749 | 70.23 |
| 2 | 1229.0343 | 3.6218 | | |
| 3 | 58.3491 | 1.0689 | 1.49700 | 81.61 |
| 4 | 29.6442 | 6.4250 | | |
| 5 | ∞ | 0.5130 | 1.49700 | 81.61 |
| 6 | 35.8952 | 6.1542 | | |
| 7 | −71.9473 | 0.5131 | 1.80000 | 29.84 |
| 8 | 79.8591 | 5.3966 | | |
| 9 | 441.4998 | 5.3846 | 1.71736 | 29.52 |
| 10 | −53.0396 | (VARIABLE 1) | | |
| 11 | −43.5346 | 3.4206 | 1.58913 | 61.14 |
| 12 | 90.4199 | 4.9979 | | |
| 13 | −174.2968 | 5.7323 | 1.51742 | 52.43 |
| 14 | −37.8726 | (VARIABLE 2) | | |
| 15 | −48.9737 | 1.3683 | 1.74000 | 28.30 |
| 16 | −97.6749 | 0.1711 | | |
| 17 | 171.5252 | 4.3976 | 1.52249 | 59.84 |
| 18 | −52.2879 | (VARIABLE 3) | | |

TABLE 3-continued

EXAMPLE 3 (PROJECTION DISTANCE 9940)

| 19 | 58.7906 | 1.3897 | 1.83400 | 37.16 |
|---|---|---|---|---|
| 20 | 40.5694 | 0.0369 | | |
| 21 | 40.9185 | 5.6574 | 1.49700 | 81.61 |
| 22 | −150.9935 | (VARIABLE 4) | | |
| 23(STOP) | ∞ | 0.8534 | | |
| 24 | 34.7187 | 1.9189 | 1.80518 | 25.42 |
| 25 | 55.7121 | 16.0447 | | |
| 26 | 34.4398 | 0.8552 | 1.83400 | 37.16 |
| 27 | 20.8150 | 14.0788 | | |
| 28 | −20.1327 | 1.3850 | 1.83481 | 42.71 |
| 29 | 57.3628 | 0.0207 | | |
| 30 | 58.4326 | 4.9041 | 1.49700 | 81.61 |
| 31 | −27.8155 | 0.4279 | | |
| 32 | 115.6974 | 6.7829 | 1.49700 | 81.61 |
| 33 | −25.7689 | 0.1699 | | |
| 34 | 49.1573 | 3.5514 | 1.49700 | 81.61 |
| 35 | −199.0905 | 8.9794 | | |
| 36 | ∞ | 51.0972 | 1.51633 | 64.14 |
| 37 | ∞ | | | |

(B)

| FOCAL LENGTH | 20.00 | 23.98 | 28.95 | 34.91 |
|---|---|---|---|---|
| ZOOM RATIO | 1.00 | 1.20 | 1.45 | 1.75 |
| (VARIABLE 1) | 38.6698 | 33.4323 | 18.3413 | 3.0268 |
| (VARIABLE 2) | 27.0718 | 18.8295 | 16.3313 | 16.1303 |
| (VARIABLE 3) | 11.0867 | 11.9010 | 17.0698 | 19.4653 |
| (VARIABLE 4) | 0.4270 | 13.0925 | 25.5129 | 38.6330 |
| Fno. | 2.5 | 2.5 | 2.5 | 2.5 |

In the optical system for projection in Example 3, correction lens group Gp may consist of only lens L12, or only lens L13. Lens L12 is a positive single lens, and lens L13 is a negative single lens. Table 5 and Table 6, which will be presented later, show values corresponding to conditional formulas (1) through (4) and values related to the conditional formulas for a case in which correction lens group Gp consists of only lens L12 and a case in which correction lens group Gp consists of only lens L13, respectively, in the optical system for projection in Example 3. Here, the optical system for projection in Example 3 is configured in such a manner that neither lens L12 nor lens L13 moves both during zooming and during focusing.

Example 4

Figure 5:
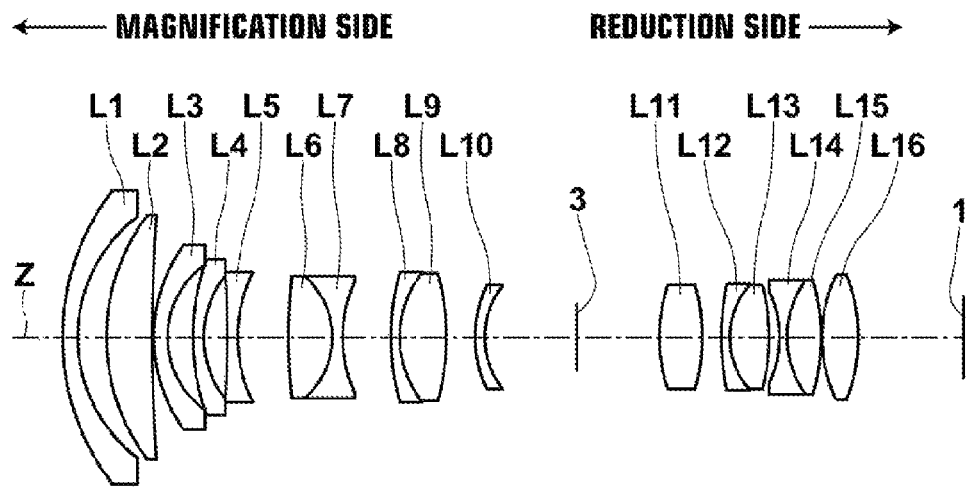
FIG. 5 is a cross section illustrating the lens structure of an optical system for projection in Example 4 of the present invention.

FIG. 5 is a diagram illustrating the lens structure of an optical system for projection in Example 4. The optical system for projection in Example 4 is a fixed focus optical system. The optical system for projection in Example 4 substantially consists of lens L1 through lens L16 arranged in this order from the magnification side.

Table 4 shows lens data on the optical system for projection in Example 4. The values in Table 4 are normalized values so that the focal length of the entire system at a wide angle end is 20.00. FIG. 9, Sections A through D are aberration diagrams of the optical system for projection in Example 4. Table 4 and FIG. 9, Sections A through D show values when a projection distance is 2330. In the optical system for projection in Example 4, correction lens group Gp may consist of only lens L11.

TABLE 4

EXAMPLE 4 (PROJECTION DISTANCE 2330)

(A)

| Si | Ri | Di | Ndj | ν dj |
|---|---|---|---|---|
| 1 | 92.9313 | 5.8000 | 1.80518 | 25.42 |
| 2 | 58.5983 | 11.0164 | | |
| 3 | 78.0949 | 17.5418 | 1.62004 | 36.26 |
| 4 | 658.6329 | 0.6860 | | |
| 5 | 61.0537 | 5.2000 | 1.77250 | 49.60 |
| 6 | 34.3981 | 9.7167 | | |
| 7 | 88.5707 | 4.2000 | 1.77250 | 49.60 |
| 8 | 38.3585 | 8.9521 | | |
| 9 | −458.1835 | 4.0000 | 1.77250 | 49.60 |
| 10 | 56.0705 | 19.5260 | | |
| 11 | 213.8746 | 16.8717 | 1.62041 | 60.29 |
| 12 | −31.0021 | 3.9000 | 1.53172 | 48.84 |
| 13 | 51.9240 | 18.5109 | | |
| 14 | 93.6387 | 3.4000 | 1.80518 | 25.42 |
| 15 | 40.5256 | 17.9222 | 1.80100 | 34.97 |
| 16 | −91.0044 | 10.9951 | | |
| 17 | 47.8009 | 3.6000 | 1.48749 | 70.23 |
| 18 | 31.9554 | 35.3672 | | |
| 19(STOP) | ∞ | 31.5855 | | |
| 20 | 62.0659 | 16.5785 | 1.43875 | 94.93 |
| 21 | −73.3000 | 7.2554 | | |
| 22 | 100.7173 | 3.2000 | 1.74320 | 49.34 |
| 23 | 30.5171 | 15.1428 | 1.49700 | 81.54 |
| 24 | −77.3912 | 3.9024 | | |
| 25 | −43.0001 | 2.9000 | 1.74400 | 44.78 |
| 26 | 37.0225 | 13.0949 | 1.49700 | 81.54 |
| 27 | −77.4564 | 0.3074 | | |
| 28 | 55.6410 | 14.0337 | 1.49700 | 81.54 |
| 29 | −64.2454 | | | |

(B)

| FOCAL LENGTH | 20.00 |
|---|---|
| Fno. | 2.7 |

Table 5 and Table 6 show values corresponding to conditional formulas (1) through (4) and values related to the conditional formulas in the aforementioned Examples 1 through 4. In Table 5 and Table 6, values when correction lens group Gp is lens L12 are shown as "Gp: L12". In the tables, "Gp:L13" and "Gp:L11" are also similar. The sign of D is positive when a magnification-side focal point of a combined optical system of correction lens group Gp through a most reduction-side lens in the entire system is located on the magnification side of a most magnification-side lens surface in correction lens group Gp. The sign of D is negative when the magnification-side focal point of the combined optical system of correction lens group Gp through the most reduction-side lens in the entire system is located on the reduction side of the most magnification-side lens surface in correction lens group Gp.

TABLE 5

| | | EXAMPLE 1 | | EXAMPLE 2 | | EXAMPLE 3 | | EXAMPLE 4 |
|---|---|---|---|---|---|---|---|---|
| | CONDITIONAL FORMULA | Gp: L12 | Gp: L13 | Gp: L12 | Gp: L13 | Gp: L12 | Gp: L13 | Gp: L11 |
| (1) | $\|\Delta Bf/(fw/100)\|$ | 1.155 | 0.981 | 1.131 | 1.039 | 0.895 | 0.963 | 0.610 |
| (2) | $\|(\Delta At \times fw)/(\Delta Bf \times Im\phi)\|$ | 0.051 | 0.004 | 0.017 | 0.030 | 0.033 | 0.066 | 0.103 |

TABLE 5-continued

| CONDITIONAL FORMULA | | EXAMPLE 1 | | EXAMPLE 2 | | EXAMPLE 3 | | EXAMPLE 4 |
|---|---|---|---|---|---|---|---|---|
| | | Gp: L12 | Gp: L13 | Gp: L12 | Gp: L13 | Gp: L12 | Gp: L13 | Gp: L11 |
| (3) | \|D/fpr\| | 0.109 | 0.240 | 0.088 | 0.245 | 0.106 | 0.349 | 0.379 |
| (4) | dd/L | 0.094 | 0.107 | 0.087 | 0.102 | 0.090 | 0.157 | 0.243 |

TABLE 6

| | EXAMPLE 1 | | EXAMPLE 2 | | EXAMPLE 3 | | EXAMPLE 4 |
|---|---|---|---|---|---|---|---|
| | Gp: L12 | Gp: L13 | Gp: L12 | Gp: L13 | Gp: L12 | Gp: L13 | Gp: L11 |
| fw | 20.000 | 20.000 | 20.000 | 20.000 | 20.000 | 20.000 | 20.000 |
| \|ΔBf\| | 0.2309 | 0.1962 | 0.2262 | 0.2077 | 0.1789 | 0.1925 | 0.1219 |
| \|ΔAt\| | 0.0120 | 0.0007 | 0.0041 | 0.0063 | 0.0050 | 0.0109 | 0.0196 |
| Imφ | 20.57 | 20.57 | 20.56 | 20.56 | 17.10 | 17.10 | 31.20 |
| D | 5.61 | 13.38 | 4.69 | 13.77 | 7.08 | 24.42 | 25.96 |
| fpr | 51.31 | 55.73 | 53.00 | 56.09 | 66.50 | 69.93 | 68.46 |
| L | 162.35 | 162.35 | 179.84 | 179.84 | 192.42 | 192.42 | 305.21 |
| dd | 15.33 | 17.34 | 15.68 | 18.28 | 17.33 | 30.12 | 74.21 |

Figure 10:
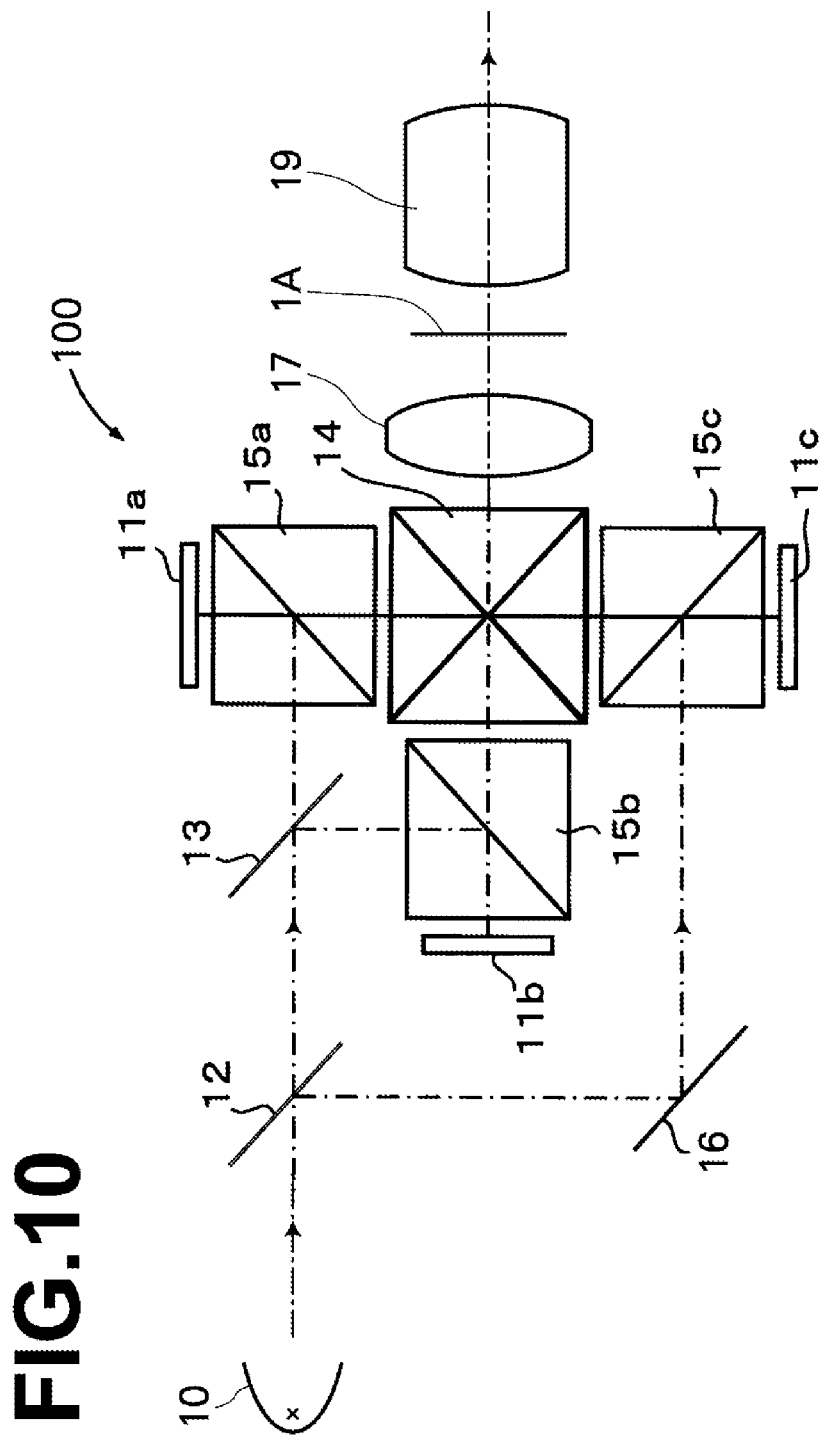
FIG. 10 is a schematic diagram illustrating the configuration of a projection-type display apparatus according to an embodiment of the present invention.

Next, embodiments of a projection-type display apparatus according to the present invention will be described with reference to FIG. 10 and FIG. 11. FIG. 10 is a schematic diagram illustrating the configuration of a projection-type display apparatus 100 according to an embodiment of the present invention. The projection-type display apparatus 100 illustrated in FIG. 10 includes a light source 10, reflection-type display devices 11a through 11c, as light valves corresponding to respective colors, dichroic mirrors 12 and 13 for color separation, a cross-dichroic prism 14 for color combination, polarized light separation prisms 15a through 15c, a total reflection mirror 16 for deflecting an optical path, a relay lens 17 and the optical system 19 for projection according to an embodiment of the present invention. Here, an integrator, such as a fly-eye integrator, is arranged between the light source 10 and the dichroic mirror 12. However, the integrator is not illustrated in FIG. 10.

White light that has been output from this light source 10 is separated into rays of three colors (G light, B light and R light) by the dichroic mirrors 12 and 13. The separated rays of respective colors enter reflection-type display devices 11a through 11c corresponding to the rays of respective colors through polarized light separation prisms 15a through 15c, respectively, and are optically modulated. After the colors are combined by the cross-dichroic prism 14, the light enters the relay lens 17. An optical image of this incident light is formed, as intermediate image 1A, by the relay lens 17. The optical image of this intermediate image 1A is projected onto a screen (not illustrated) by the optical system 19 for projection.

Figure 11:
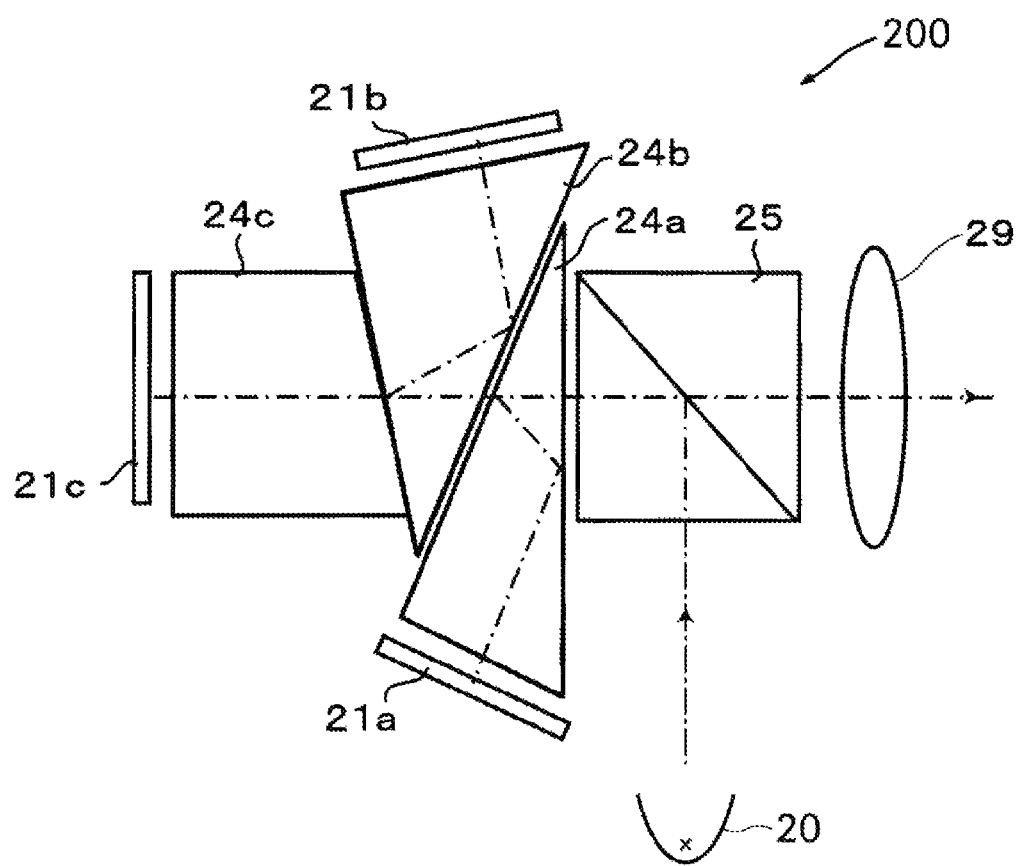
FIG. 11 is a schematic diagram illustrating the configuration of a projection-type display apparatus according to another embodiment of the present invention.

FIG. 11 is a schematic diagram illustrating the configuration of a projection-type display apparatus 200 according to another embodiment of the present invention. The projection-type display apparatus 200 illustrated in FIG. 11 includes a light source 20, reflection-type display devices 21a through 21c, as light valves corresponding to respective colors, TIR (Total Internal Reflection) prisms 24a through 24c for color separation and color combination, a polarized light separation prism 25 and an optical system 29 for projection according to an embodiment of the present invention. Here, an integrator, such as a fly-eye integrator, is arranged between the light source 20 and the polarized light separation prism 25. However, the integrator is not illustrated in FIG. 11.

White light that has been output from the light source 20 travels through the polarized light separation prism 25. After then, the light is separated into rays of light of three colors (G light, B light and R light) by the TIR prisms 24a through 24c. The separated rays of light of respective colors enter the reflection-type display devices 21a through 21c corresponding to them, and are optically modulated. Then, the rays travel again through the TIR prisms 24a through 24c in reverse directions, and colors are combined. After then, the rays are transmitted through the polarized light separation prism 25, and enter the optical system 29 for projection. Then, an optical image of this incident light is projected onto a screen (not illustrated) by the optical system 29 for projection.

As the reflection-type display devices 11a through 11c and 21a through 21c, for example, a reflection-type liquid crystal display device, a DMD or the like may be used. FIG. 10 and FIG. 11 illustrate examples in which reflection-type display devices are used as light valves. However, light valves provided in the projection-type display apparatus of the present invention are not limited to them. Transmission-type display devices, such as transmission-type liquid crystal display devices, may be used.

So far, the present invention has been described by using embodiments and examples. However, the optical system for projection of the present invention is not limited to the aforementioned examples, and various modifications of the mode are possible. For example, a curvature radius, a distance between surfaces, a refractive index, and an Abbe number of each lens may be appropriately modified.

Further, the configuration of the projection-type display apparatus of the present invention is not limited to the aforementioned configurations. For example, light valves to be used and optical members to be used to separate or combine rays are not limited to the aforementioned configurations, and various modifications of the mode are possible.

What is claimed is:
1. An optical system for projection that is telecentric on a reduction side,
wherein a correction lens group substantially consisting of a part of lens groups in the optical system for projection is configured to move in the direction of an optical axis to correct a shift in a focal position caused by a change in temperature, and wherein the following conditional formulas (1), (2) and (3) are satisfied:

$$0.5 < |\Delta Bf/(fw/100)| < 5.0 \quad (1);$$

and $$|(\Delta At \times fw)/(\Delta Bf \times Im\phi)| < 0.12 \quad (2);$$

$$|D/fpr| < 0.50 \quad (3),$$

where
- $\Delta Bf$: a movement amount of a reduction-side focal position when the correction lens group has been moved by fw/100,
- fw: a focal length of an entire system,
- $\Delta At$: a variation amount of a tangential component of astigmatism at a maximum angle of view when the correction lens group has been moved by fw/100,
- Im$\phi$: the diameter of a maximum effective image circle on the reduction side,
- D: a distance on the optical axis from a magnification-side focal position of a combined optical system of the correction lens group through a most reduction-side lens in the entire system to a most magnification-side lens surface in the correction lens group, and
- fpr: a focal length of the combined optical system of the correction lens group through the most reduction-side lens in the entire system, and wherein $\Delta Bf$, fw, $\Delta At$, D and fpr are values at a wide angle end when the optical system for projection is a variable magnification optical system.

2. The optical system for projection, as defined in claim 1, wherein the following conditional formula (1') is satisfied:

$$0.8 < |\Delta Bf/(fw/100)| < 2.0 \quad (1').$$

3. The optical system for projection, as defined in claim 1, wherein the following conditional formula (2') is satisfied:

$$|(\Delta At \times fw)/(\Delta Bf \times Im\phi)\phi < 0.07 \quad (2').$$

4. The optical system for projection, as defined in claim 1, wherein the following conditional formula (3') is satisfied:

$$|D/fpr| < 0.40 \quad (3').$$

5. The optical system for projection, as defined in claim 1, wherein the following conditional formula (4) is satisfied:

$$dd/L > 0.05 \quad (4),$$

where
- when the optical system for projection is a fixed focus optical system,
- L: a distance on the optical axis from a most magnification-side lens surface in the entire system to a most reduction-side lens surface in the entire system, and
- dd: a sum of a magnification-side lens surface distance from the correction lens group and a reduction-side lens surface distance from the correction lens group, and
- when the optical system for projection is a variable magnification optical system,
- L: a maximum value of a distance on the optical axis from a most magnification-side lens surface in the entire system to a most reduction-side lens surface in the entire system, and
- dd: a minimum value of a sum of a magnification-side lens surface distance from the correction lens group and a reduction-side lens surface distance from the correction lens group.

6. The optical system for projection, as defined in claim 5, wherein the following conditional formula (4') is satisfied:

$$dd/L > 0.08 \quad (4').$$

7. The optical system for projection, as defined in claim 1, wherein at least three positive lenses with Abbe numbers of 75 or higher for d-line are included.

8. The optical system for projection, as defined in claim 1, wherein the correction lens group substantially consists of a single lens.

9. The optical system for projection, as defined in claim 1, wherein the correction lens group moves neither during zooming nor during focusing.

10. A projection-type display apparatus comprising:
- a light source;
- a light valve on which light from the light source is incident; and
- the optical system for projection, as defined in claim 1, as an optical system for projection that projects an optical image of light that has been optically modulated by the light valve onto a screen.

* * * * *